Jan. 5, 1926.

I. RUIZ

SPOUT FOR SUGAR BOWLS

Filed July 7, 1924

1,568,923

WITNESSES:
Cris Leinle
Robert I. Hulsizer

INVENTOR,
Ignacio Ruiz.
BY Munn & Co
ATTORNEYS.

Patented Jan. 5, 1926.

1,568,923

UNITED STATES PATENT OFFICE.

IGNACIO RUIZ, OF NEW YORK, N. Y., ASSIGNOR OF ONE-FOURTH TO WILLIAM O. HAHN, OF NEW YORK, N. Y.

SPOUT FOR SUGAR BOWLS.

Application filed July 7, 1924. Serial No. 724,707.

*To all whom it may concern:*

Be it known that I, IGNACIO RUIZ, a citizen of the United States, and a resident of the city of New York, borough of Manhattan, in the county and State of New York, have invented a new and Improved Spout for Sugar Bowls, of which the following is a full, clear, and exact description.

This invention relates to a spout for sugar bowls and the like.

An object of the invention is to provide a simple and efficient spout which can be readily attached to most any kind of sugar bowl or container and can be readily detached therefrom for the purpose of cleaning.

Another object is the provision of a spout which is simple in construction and can be manufactured at a very low cost because of the fact that it is made of a very few, simple parts.

The invention is illustrated in the drawings, of which—

Figure 1:
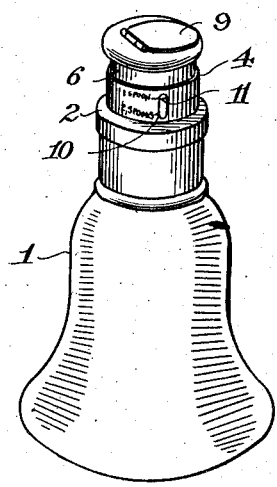
Figure 1 is a perspective view of a container with the spout attached.

The form of the invention shown in the drawings is a preferred form, although it is understood that modifications in the construction and arrangement of the parts and in the character of the materials used may be adopted without departing from the spirit of the invention as set forth in the appended claims.

In its general aspect the invention comprises a simple cylinder, preferably of metal, which is insertable or dependent through the cover of a container, such as a sugar bowl. This cylinder is provided with an opening at one end for the passage of the material therefrom, and at a point in its lateral wall the metal is cut and bent inwardly to provide an opening, the bent metal forming a baffle plate to control the flow of the material from the container into the cylinder. If desirable the end of the cylinder projecting from the container can be provided with a flap or it can be left open. If the flap is left off it will be obvious that the entire cylinder can be made of one piece of material, because the baffle plate which is cut and bent to form the opening in the lateral wall is cut and bent out of the metal of the cylinder itself.

In a still further general aspect the invention may include a plate to be disposed over the end of the container or sugar bowl provided with an opening in which there is disposed a cylindrical sleeve also cut away on its lateral wall to provide an opening, and into this cylindrical sleeve the previous mentioned spout or cylinder can be inserted so as to be provided with a firm guiding seat. The opening in the cylinder and the opening in the sleeve are necessarily brought into alinement for the discharge of material, although the cylinder can be turned or rotated within the sleeve to bring the openings out of alinement so as to prevent the discharge of material if desired.

Figure 2:
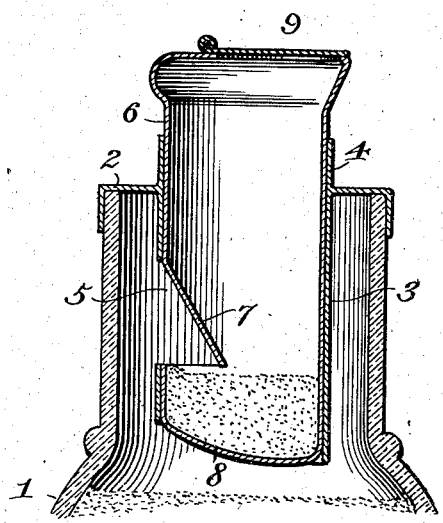
Fig. 2 is an enlarged section taken therethrough.
Figure 3:
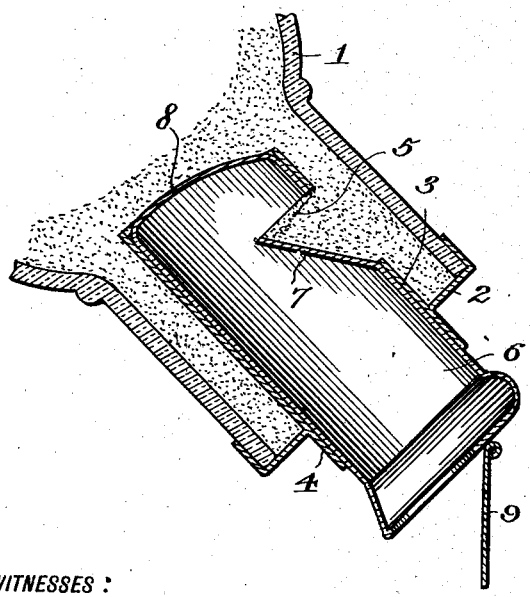
Fig. 3 is an enlarged section of the end of the container with the spout attached, shown in the position of discharge.
Figure 4:
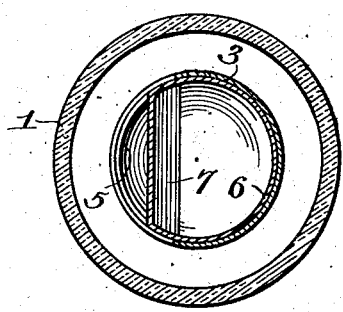
Fig. 4 is a horizontal section taken across the neck of the container and through the spout.

In the normal position of the cylinder of the sleeve, shown in Fig. 2, the bottom of the cylinder is adapted to receive a quantity of material amounting to approximately a teaspoonful. If, however, the cylinder is moved down within the sleeve, then a greater volume of the cylinder is presented below the opening in the sleeve and, consequently, when the container is tipped downward and then moved back to normal position again a greater quantity of material will lie in the bottom of the cylinder. Preferably when the cylinder is depressed to its lowermost position, two teaspoonfuls of material will be found in the bottom of the cylinder to be discharged when the container is again inverted.

The preferred embodiment of the invention shown in the drawings includes a container 1 across the open end of which a flanged cap 2 is disposed. This cap is provided with an opening in which a sleeve 3 is mounted, the upper end 4 of the sleeve projecting above the cap. The sleeve is provided with a lateral opening 5. A cylinder 6 is adapted to fit snugly within the sleeve and is provided with a portion 7 in the form of a baffle plate which is cut, and opens inwardly, from the material of the cylinder itself to form an opening which may register with the opening 5 in the sleeve. The bottom end 8 of the cylinder is closed, and the upper end is preferably open but may be closed by means of a flap valve 9, if desired. The upper end 4 of the sleeve may be provided with a slot 10 and marked adjacent this slot with indicia representing one and two teaspoonfuls. A mark 11 will be seen on the cylinder through this slot, and by registering the mark on the cylinder with the marks on the sleeve the position of the cylinder within the sleeve can be determined to regulate the quantity of material to be placed in the bottom of the cylinder each time the container is manipulated.

It will be observed that the spout itself comprises merely the cylinder, of which the baffle plate 7 is an integral part, and that the whole device essentially comprises but one piece of material. The flap 9 can be dispensed with if desired, and the cylinder 3 can be dispensed with. The cylinder need only be inserted in a suitable aperture provided in the top of any container and depend into the container so that the opening formed by the deflection in the baffle plate 7 will be within and below the top of the container for the purpose of proper functioning. By providing the sleeve 3 I more properly insure the seating of the cylinder, and by providing the flap 9 I am enabled to keep the interior of the cylinder closed from the atmosphere when desired. This spout is a simple and efficient device formed of material that can be manufactured at a very low cost. The parts are such as to become little likely to wear out in use, and the device is such as to become readily adaptable to application to any type of container. It can be readily removed therefrom for the purpose of cleaning.

What I claim is:—

1. A spout for sugar bowls and the like, which comprises a cylinder adapted to be inserted through the top of a container, said cylinder having a closed bottom and a baffle plate bent from the material of the cylinder itself on its lateral wall, the bending of the baffle plate inwardly forming an opening through which the material can be discharged into the cylinder from the container.

2. In combination, a container having an open end, a flanged apertured cap disposed over the end of the container, a sleeve mounted in said aperture, said sleeve having an opening formed in the lateral wall thereof beneath the cap, a cylinder slidably mounted in said sleeve, said cylinder having a closed bottom and an open upper end, and a baffle plate cut and bent inwardly from the lateral walls of the cylinder to form an opening, said opening being capable of being alined with the opening in the sleeve.

IGNACIO RUIZ.